United States Patent Office 2,890,243
Patented June 9, 1959

2,890,243

PREPARATION OF POLYCHLOROBENZOIC ACIDS

Robert L. Brown, West Chester, Pa., and Richard J. Gobeil, Wilmington, Del., assignors to E. I. du Pont de Nemours and Company, Wilmington, Del., a corporation of Delaware No Drawing. Application November 15, 1956
Serial No. 622,235

3 Claims. (Cl. 260—515)

This invention relates to a process for the preparation of polychlorobenzoic acids.

Recently, much research has been done on the use of tri- and tetrachlorobenzoic acids as herbicides. For example, it has been found that 2,3,6-trichlorobenzoic acid and 2,3,5,6-tetrachlorobenzoic acid are active herbicides. Compositions containing these and other tri- and tetrachlorobenzoic acid isomers have been suggested for this use.

It has been found that compositions containing excellent yields of polychlorobenzoic acid isomer mixtures, consisting predominantly of tri- and tetrachloro compounds, can be prepared economically by the process of the present invention. This process is featured by the absence of a solvent medium. A crude product in usable form can be prepared directly without any step of separating the product from a solvent reaction medium.

This process comprises chlorinating benzoyl chloride at a temperature of about 100–150° C. to give a mixture of polychlorobenzoyl chlorides. This is done by passing chlorine gas through the molten benzoyl chloride in the presence of a catalytic amount, ordinarily from about 1 to 5% of the weight of benzoyl chloride, of a catalyst selected from the group consisting of anhydrous ferric chloride, anhydrous antimony trichloride and mixtures thereof. Similar catalytic amounts of iodine in the reaction mixture, in addition to the above catalysts, also assist chlorination. The chlorination is continued until at least about 2.5 molar equivalents of chlorine per mol of benzoyl chloride have been reacted with the benzoyl chloride, that is substituted onto the benzene ring of the benzoyl chloride. Preferably from about 2.8–4.0 molar equivalents of chlorine are added for the best herbicidal compositions.

After completion of the chlorination, a catalytic amount of sulfuric acid is added to the reaction mass, ordinarily an amount equal to about 0.4–3% by weight of the reaction mass. The temperature of the mass is then adjusted so as to be maintained within the range of 75–215° C. during the succeeding step. The higher temperatures, say 180°–215° C., are required only when the larger amounts of chlorine have been used, and preferably are avoided when less than 4 mol equivalents of chlorine per mol of benzoyl chloride have been used. Where from 2.8–4.0 mols of chlorine per mol of benzoyl chloride have been added, a temperature within the range of about 75–170° C. is best.

The particular temperature within these ranges should be selected to maintain the reaction mass in a fluid condition throughout the succeeding step. Thus, the mass may be entirely molten with no solids present, or it can be partially solidified so long as it is sufficiently fluid to be stirred easily. This is necessary to permit the succeeding reaction to proceed efficiently and completely.

When the reaction mass is at the proper temperature, water (either liquid or steam) is then added slowly while maintaining the proper temperature as described above. The addition of water is continued until there has been added an amount substantially equivalent to the amount of polychlorobenzoyl chloride present in the reaction mass, on a molar basis. Often a slight excess will be employed to insure completion of the reaction and to make up for any water that may have boiled out of the reaction mass.

The resulting product is a molten mass consisting essentially of various polychlorobenzoic acid isomers, and containing as impurities the catalyst and the sulfuric acid. This material can be used as such in herbicidal compositions; alternatively, it can be purified by crystallization from water or an organic solvent such as chloroform.

In the preferred practice of the present invention, wherein from about 2.8–4.0 molar equivalents of chlorine are employed for each mol of benzoyl chloride, the product consists in a major amount of a mixture of tri- and tetrachlorobenzoic acids.

In order that the present invention can be better understood, the following examples are given:

*Example 1*

A mixture of 140.6 parts by weight of benzoyl chloride, 1.2 parts by weight of anhydrous ferric chloride, 1.2 parts by weight of antimony trichloride and 0.4 part by weight of iodine are charged into a round bottom flask equipped with a magnetic stirrer, a gas inlet tube, a thermometer and a water and Dry Ice condenser in series.

A mixture of chlorine and a small amount of nitrogen is passed through the gas inlet tube for 8–14 hours until the increase in weight of the pot is 112 grams. This is equivalent to a chlorine uptake of 3.26 mols. The temperature is maintained at 110–140° C. throughout the chlorination cycle by means of a heated oil bath. The chlorine feed rate is controlled so that only a small amount of chlorine is condensed and returned to the system by the Dry Ice condenser.

The temperature of the reaction mass is then adjusted to 115° C., and 5 parts by weight of anhydrous sulfuric acid are added. To the reaction mass is then slowly added 20 parts by weight of water. When the evolution of hydrogen chloride is complete, the reaction mass is removed from the flask, allowed to solidify and then ground in a mortar and pestle. There is thus obtained 240 parts by weight of a light brown powder, M.P. 97–115° C., containing a herbicidally active mixture of tri- and tetrachlorobenzoic acids.

*Examples 2–8*

The following examples are performed in accordance with the procedure of Example 1 using the amounts of reactants and catalysts and the temperatures set forth in the table below. In each example there is produced a herbicidally active mixture of polychlorobenzoic acids.

[Chlorination of 140.6 parts by weight of benzoyl chloride.]

| Example | Catalyst—Parts by Weight | | | Reaction Temperature, ° C. | Chlorine Uptake, Mols | Hydrolysis | |
|---|---|---|---|---|---|---|---|
| | $FeCl_3$ | $SbCl_3$ | $I_2$ | | | Temp., ° C. | Wt. Percent $H_2SO_4$ |
| 2 | 2.4 | 1.2 | 0.4 | 120–125 | 4.30 | 175 | 1.5 |
| 3 | 2.4 | | | 135–140 | 2.75 | 130 | 0.7 |
| 4 | | 2.4 | | 140–145 | 2.53 | 75 | 1.0 |
| 5 | 1.2 | | 0.4 | 125–130 | 2.90 | 140 | 2.5 |
| 6 | 2.4 | 2.4 | 0.8 | 130–125 | 5.00 | 215 | 3.0 |
| 7 | 1.2 | 1.2 | 0.4 | 100–110 | 3.15 | 120 | 0.4 |
| 8 | 1.2 | 1.2 | 0.4 | 145–150 | 3.40 | 125 | 2.0 |

We claim:

1. The process for the preparation of polychlorobenzoic acid comprising adding to polychlorobenzoyl chloride a catalytic amount of sulfuric acid, and then while maintaining the polychlorobenzoyl chloride fluid and at a temperature within the range of about 75–215° C. adding to the polychlorobenzoyl chloride water in an amount substantially equivalent on a molar basis to the amount of polychlorobenzoyl chloride present, whereby substantially anhydrous polychlorobenzoic acid is prepared.

2. The process in accordance with claim 1 wherein said polychlorobenzoyl chloride contains about 2.8 to 4.0 mols of chlorine per mol of polychlorobenzoyl chloride, and wherein said temperature is maintained within the range of about 75 to 170° C.

3. The process in accordance with claim 1 wherein said catalytic amount of sulfuric acid is about 0.4 to 3% by weight of the polychlorobenzoyl chloride.

References Cited in the file of this patent

UNITED STATES PATENTS 2,552,591     Rueggeberg et al.     May 15, 1951
2,607,802     Britton et al.     Aug. 19, 1952

OTHER REFERENCES

Hope et al.: Chem. Absts. 18, pp. 237–8 (1924).
Fieser et al.: Organic Chemistry, pp. 684–5 (1950).
Wagner et al.: Synthetic Organic Chemistry, p. 418 (1953).